United States Patent Office 3,172,830
Patented Mar. 9, 1965

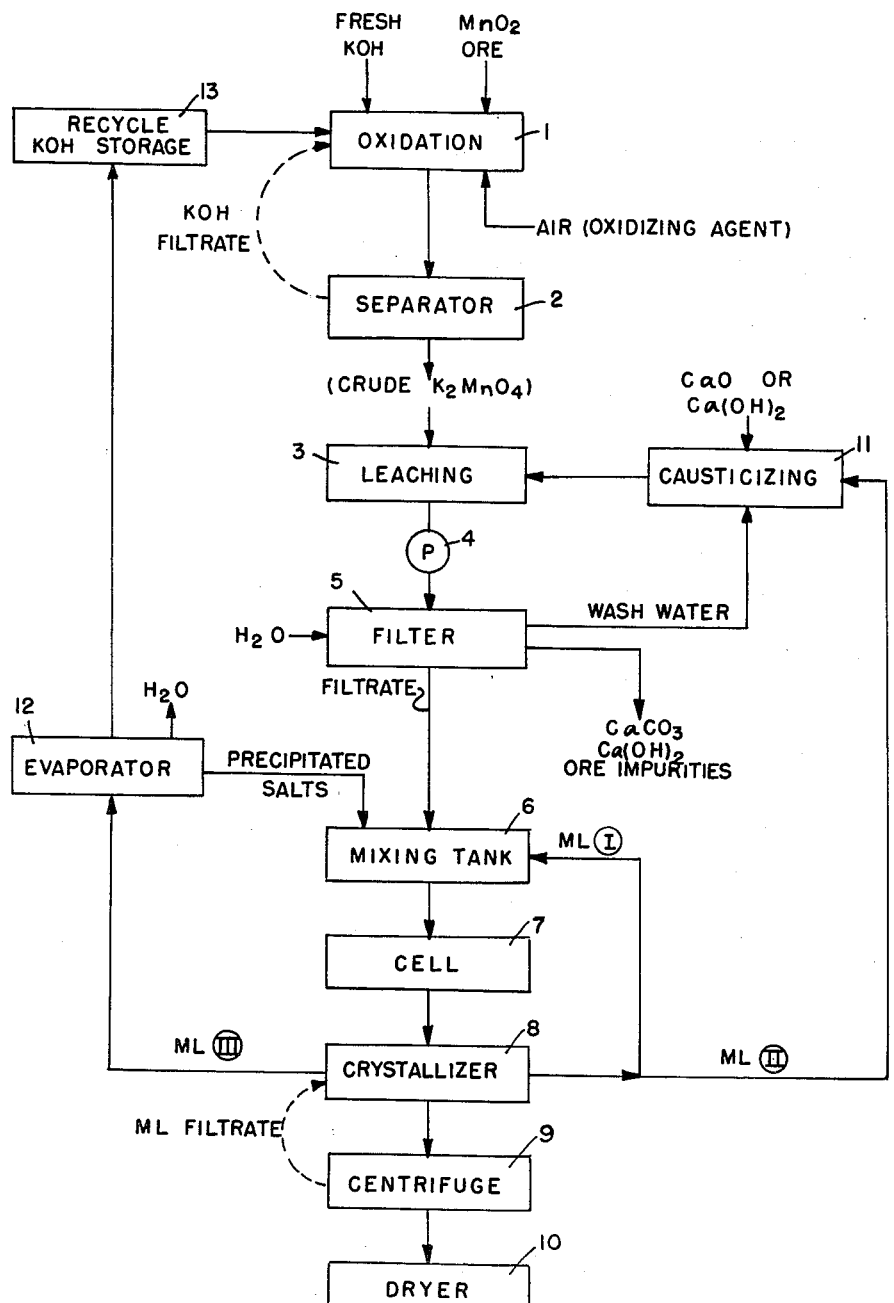

3,172,830
REMOVAL OF IMPURITIES AND RECOVERY OF POTASSIUM HYDROXIDE IN THE PRODUCTION OF POTASSIUM PERMANGANATE
Milton B. Carus, La Salle, Ill., assignor to Carus Chemical Company, Inc., a corporation of Illinois
Filed Oct. 11, 1961, Ser. No. 144,480
7 Claims. (Cl. 204—82)

This invention relates to a method of removing impurities during the production of potassium permanganate while also recovering potassium hydroxide. In particular, a large proportion of the impurities in a product stream are converted into potassium hydroxide, and the resulting caustic solution has a special utility as a recycle stream in the overall process for the production of potassium permanganate.

According to prior processes, the manufacture of potassium permanganate ($KMnO_4$) from a manganese-containing raw material, such as manganese dioxide ($MnO_2$) contained in a number of natural ores, essentially requires two different types of oxidizing steps, both of which require the presence of potassium hydroxide as well as an oxidizing agent. The first of these steps involves the production of potassium manganate VI ($K_2MnO_4$) and may also include the preparation of the intermediate potassium manganate V ($K_3MnO_4$). The second of these steps is an electrolytic oxidation for conversion of the potassium manganate VI into potassium permanganate. These two oxidizing steps can be generally represented by the following equations:

(1) $MnO_2 + 2KOH + \tfrac{1}{2}O_2 \longrightarrow K_2MnO_4 + H_2O$ (2) $K_2MnO_4 + H_2O \xrightarrow{\text{electr.}} KMnO_4 + KOH + \tfrac{1}{2}H_2\uparrow$ The steps represented by Equation 1 is a high temperature oxidation with air or other oxygen-containing gases and is carried out in the presence of a relatively highly concentrated potassium hydroxide. A number of methods are known for this oxidation step; for example, it has been a common procedure to produce the potassium manganate VI by roasting a solids mixture of the manganese dioxide ore and potassium hydroxide, the solids having been ground into finer particles after an initial mixing of the two ingredients. The roasting is usually carried out with air at about 225° C. while intermittently spraying water on the ground mixture of solids. The oxidation according to Equation 1 is preferably carried out according to more recent developments by adding the ore to a highly concentrated potassium hydroxide melt and introducing an oxygen-containing gas at elevated temperatures. This liquid phase type of oxidation is described in detail in the following patents: U.S. 2,940,821; U.S. 2,940,822; and U.S. 2,940,823.

Regardless of the manner in which the ore is oxidized according to Equation 1, the desired product is the potassium manganate VI which then serves as the raw material or initial reactant for the electrolytic oxidation of Equation 2. It has been found most convenient to carry out this electrolytic oxidation in accordance with United States Patents 2,843,537 and 2,908,620, the disclosures of which are also incorporated herein by reference as fully as if they were set forth in their entirety.

The end product of the electrolytic oxidation is potassium permanganate obtained in the form of crystals from a concentrated mother liquor. This aqueous mother liquor, which represents a saturated solution of potassium permanganate, also contains relatively large amounts of potassium hydroxide as well as alkali-soluble impurities consisting predominately of potassium carbonate and minor or trace amounts of such compounds as potassium silicates, potassium aluminates, potassium phosphates, potassium vanadates, potassium molybdates, potassium arsenates, etc. The separation of the potassium hydroxide and other impurities from the potassium permanganate does not pose any particular problem since the crystals of the potassium permanganate are readily separable, e.g. by centrifuging, from the mother liquor in which the impurities are dissolved. However, the handling of the mother liquor does present a most serious problem because it is essential to recover the potassium hydroxide contained therein as well as uncrystallized potassium permanganate and small quantities of unreacted potassium manganate VI. It is therefore necessary to recycle the mother liquor to other points of the process, even though this procedure causes a build-up of undesirable impurities in the overall process.

It is thus known in the industrial production of potassium permanganate that of the total amount of potassium hydroxide initially introduced into the process, usually as a commercial grade of caustic potash, only about 40% is used to form the end product. The remaining 60% of potassium hydroxide is carried through the process, e.g. in aqueous solution, as a reaction medium. The reuse of this large excess of potassium hydroxide is an important economic factor in itself, but it is also important to recover the potassium permanganate and manganate which remain dissolved in the mother liquor during crystallization. Unfortunately, this mother liquor cannot be directly recycled without at least partly removing alkali-soluble impurities such as potassium carbonate which accumulate during each cycle of the process. For example, if the potassium carbonate concentration increases to more than 45 grams per liter or even more than 40 grams per liter, the yields and purity of the end product are seriously affected. Much lower concentrations of impurities are preferred. Accordingly, some method of continuously removing such impurities has long been recognized as an essential step in the process.

The potassium carbonate and other impurities originate partly from the manganese oxide ore which is never a completely pure manganese dioxide. Whenever air comes in contact with the potassium hydroxide solutions in the process, additional quantities of potassium carbonate are also formed. The ore also contains small amounts of still other impurities which are insoluble in the potassium hydroxide solution being introduced into the electrolytic oxidation step and are removed by a conventional filter at this point. Such insoluble impurities in the ore include Fe, CaO, MgO, BaO, Cu, Pb, P, Ni and Co as such, or in combined form.

In order to remove the alkali-soluble impurities, and especially potassium carbonate, a number of different techniques have been suggested, all of which require a causticization of the potassium carbonate with lime, i.e., CaO or $Ca(OH)_2$ according to the following equation:

(3) $K_2CO_3 + Ca(OH)_2 \rightarrow 2KOH + CaCO_3$

For example, one suggestion has been to mix lime with the raw or impure ore before it is introduced into the first oxidation step. This procedure would be highly impractical because of the difficulties in handling large quantities of the ore through causticizing and impurity removal steps. Furthermore, a preliminary treatment of the crude ore would not remove potassium carbonate or similar impurities formed during the oxidizing process itself.

A more common method of removing the potassium carbonate and other alkali-soluble impurities has been to concentrate the recycled potassium hydroxide solution by evaporation of water to a specific gravity of about 1.575 to 1.585, at which point a major proportion of the impurities will precipitate out of the solution. Potassium manganate and potassium permanganate will also precipitate out of the solution, and these valuable materials together with the precipitated impurities are filtered off as solids which may be designated as "evaporator salts." In order to avoid the loss of the valuable products and to recover as much potassium hydroxide as possible, the filtered off solids or "evaporator salts" are then redissolved in water and causticized with $Ca(OH)_2$ at boiling temperature. The resulting KOH solution must be relatively dilute since the causticizing reaction (3) is a reversible one and the conversion of the impurities into KOH decreases with increasing KOH concentration. Therefore, after separating the solid impurities such as $CaCO_3$ from the solution, concentration by evaporation is required to obtain a sufficiently concentrated KOH solution for reuse in the overall process.

One objectionable feature in causticizing the "evaporator salts" is that the level of impurities in the overall process still remains quite high. It is usually impossible to evaporate sufficiently to remove all impure salts and relatively large amounts of impurities continue to be recycled. Furthermore, there is a substantial loss of $K_2MnO_4$ caused by hydrolysis during causticization of the "evaporator salts." In addition, there must be a large investment in plant equipment in order to carry out the causticization, to filter off the resulting calcium carbonate, unreacted lime and similar impurities, and to evaporate water for reconcentration of the KOH solution. The evaporation costs of this procedure are especially high because of the large amount of water which must be removed, first to precipitate the "evaporator salts" and later to reconcentrate the KOH solution for recycle in the process.

Because of these numerous disadvantages, it has also been proposed to carefully separate the "evaporator salts" so as to obtain potassium carbonate as an end product. However, this alternative procedure is quite unattractive since it requires a complete carbonization of all adherent potassium hydroxide, a reduction and removal of the manganate content and the removal of silicates, aluminates and the like. Not only is a portion of the manganate content lost from the process but also the resulting potassium carbonate does not have enough economic value to offset the added costs in its recovery.

The main object of the present invention is to provide a method of removing impurities and recovering potassium hydroxide during the oxidation of a manganese oxide ore to potassium permanganate whereby the various disadvantages of prior processes can be substantially avoided.

A specific object of the present invention is to substantially lower the level of alkali-soluble impurities in the overall process of producing potassium permanganate.

Another specific object of the invention is to avoid the loss of valuable products from the overall system, e.g., by hydrolysis of $K_2MnO_4$ during causticization.

Still another specific object of the invention is to obtain an optimum recovery and recycle use of potassium hydroxide while at the same time avoiding high costs of evaporation.

Yet another object of the invention is to avoid difficult and expensive filtration steps for removal of undesirable impurities at different points in the overall process of producing potassium permanganate.

These and other objects and advantages of the present invention will be best explained by the following detailed description of the invention taken in conjunction with the accompanying drawing which illustrates the overall process for the production of potassium permanganate in a schematic flow diagram and includes the specific treatment for removal of impurities and recovery of potassium hydroxide.

The present invention is characterized by the discovery that it is possible to directly causticize the mother liquor from which a potassium permanganate product is crystallized following the two step oxidation of a manganese oxide ore. This mother liquor consists essentially of an aqueous solution of potassium hydroxide, potassium permanganate, potassium manganate VI, and potassium carbonate. Small amounts of potassium silicates, aluminates, vanadates, phosphates, molybdates, arsenates, etc. may also be dissolved in this mother liquor and taken together with the potassium carbonate constitute the alkali-soluble impurities which are converted into potassium hydroxide by causticization with CaO or $Ca(OH)_2$. The mother liquor from the crystallizer is preferably diluted with water prior to causticizing in order to carefully control the concentration of KOH and impurities. The causticizing should be carried out at a potassium hydroxide concentration of at least 30 grams per liter and preferably at least 60 grams per liter, these concentrations being taken with reference to the initial state of the mother liquor after controlled dilution but before the alkali-soluble impurities are converted into potassium hydroxide. During the causticizing treatment, the KOH concentration should generally remain within limits of 30 to 120 grams per liter, preferably about 60 to 100 grams per liter, the reaction being carried out at 55–95° C., and preferably at about 70–80° C. This causticizing step is advantageously carried out approximately at normal pressure, i.e., at about one atmosphere and with adequate agitation.

A further important discovery according to the present invention is that after causticizing the diluted mother liquor by the foregoing procedure, it can be directly employed as a leaching medium for treatment of the $K_2MnO_4$ obtained as an intermediate product from the first oxidation step of Equation 1 above. This leaching medium should have a KOH concentration of about 40–130 grams per liter, preferably about 70–110 grams per liter, and this condition can be readily provided by the causticized mother liquor. Thus, in the overall process, it becomes possible to recycle at least a portion of the mother liquor in order to leach $K_2MnO_4$ prior to electrolytic oxidation thereof, and at the same time convert the alkali soluble impurities such as potassium carbonate into potassium hydroxide so that a low level of impurities is maintained in the electrolytic portion of the process. The addition of CaO or $Ca(OH)_2$ for causticization does not adversely affect the leaching step even when employed in substantial excess, and these causticizing agents are readily removed by subsequent filtration so that they do not enter into the electrolytic oxidation.

The excess causticizing agent is preferably filtered simultaneously together with the insoluble impurities formed during causticizing and also with the insoluble ore impurities, thereby avoiding separate difficult filtration steps.

The overall process for the production of potassium permanganate and the use of the causticizing method of the invention in conjunction therewith is shown in the accompanying flow diagram which represents a preferred embodiment of the invention. It will be understood that those steps of the overall process other than the causticizing method of the invention and its combination with the overall process are generally well known, and it is therefore possible to modify or employ alternative procedures in such known steps without departing from the spirit or scope of the present invention. For example, the specific steps for oxidation according to Equations 1 and 2 above can be carried out in any known manner, and under a relatively wide range of reaction conditions, without avoiding the necessity of removing alkali soluble impurities and recovering potassium hydroxide. For this reason, the description of the flow diagram is given in detail with respect to those conditions which are essentially directed to the novel causticizing and recycle of mother liquor according to the invention. Otherwise, the overall process shown herein is intended to be illustrative only and not exclusive.

In the flow diagram, the overall process is substantially continuous and is readily adapted to automatic control. The first step of the process is represented by oxidation of a manganese oxide ore in a suitable reaction vessel 1 or series of vessels, preferably by a liquid phase oxidation carried out in a highly concentrated 65 to 90% (by weight) potassium hydroxide melt. Air or some other oxygen-containing gas is supplied for this oxidation, and both fresh and recycle KOH may be introduced and adjusted to the desired concentration. The $K_2MnO_4$ reaction product precipitates out and forms a solid slurry which can be transferred to the separator 2 in order to recover the solid product.

At the high KOH concentrations employed in a liquid phase oxidation, the $K_2MnO_4$ is relatively insoluble as are such impurities as $K_2CO_3$ and the like. Therefore, the $K_2MnO_4$ product is not in pure form but contains those impurities which are termed "alkali-soluble," i.e. potassium carbonate and also such minor impurities as the silicates, aluminates and/or phosphates of potassium. In addition, there is normally present a small amount of completely insoluble impurities or by-products derived from a minor ore content of such elements as iron, calcium, magnesium, barium, copper, lead, phosphorous, nickel or cobalt. These insoluble materials are hereinafter referred to as "ore impurities."

With the liquid phase oxidation in vessel 1, it is usually necessary to separate the concentrated KOH solution from the solid product, and this solution may then be recycled to the liquid phase oxidation as indicated. Where the ore is roasted in an almost dry state, it will be understood that the resulting product is relatively dry and usually does not require such additional treatment.

The impure $K_2MnO_4$ product is then combined with a more dilute KOH solution in which the manganate and impurities such as potassium carbonate are dissolved while the ore impurities remain undissolved. This step is carried out in a suitable mixing tank 3 by addition of a diluted and causticized mother liquor from heated vessel 11. This mother liquor employed for leaching is discussed more fully below, but with reference to the leaching step, it is so prepared as to provide 30–120 grams per liter, and preferably 60–100 grams per liter of KOH. The crude $K_2MnO_4$ product is added to this mother liquor in order to obtain a $K_2MnO_4$ concentration of about 100–200 grams per liter, preferably about 120–150 grams per liter. Leaching of the crude $K_2MnO_4$ can be carried out at a temperature of about 45–95° C., and preferably at about 60–80° C. Under these conditions, the hydrolysis of $K_2MnO_4$ is at a minimum as it is leached into a concentrated solution for electrolysis.

The leach solution is conducted from vessel 3 by means of a suitable pump 4 into a filter or series of filters 5 for separation of all solid impurities including those which are produced during causticization of the mother liquor. If a single filter is employed, the leach filtrate solution containing the dissolved $K_2MnO_4$ should be collected separately from wash water in order to provide better control over the concentration of dissolved substances. Of course, separate filtrates can also be easily obtained by employing a series of two or more filters in conventional manner. The filtrate from filter 5 as leach solution is conducted to mixing tank 6 in which the concentration of the various ingredients can be accurately adjusted for optimum results during electrolysis. The solids from filter 5 are washed and discarded, and the wash water is preferably recovered for use in causticization. The solid impurities from filter 5 consist primarily of $CaCO_3$, excess $Ca(OH)_2$ and the insoluble ore impurities. Substantially all of the other alkali-soluble impurities, e.g. calcium silicates, are also removed at this point.

In mixing tank 6, the leach solution is preferably diluted with at least a portion of the mother liquor ML–I and precipitated third salts can also be added from an evaporator 12. If necessary, additional water can be added at this point in order to reduce the amount of mother liquor recycled directly to the mixing tank. However, additional quantities of water are desirably kept to a minimum in order to avoid excessive evaporation costs. The mixing in tank 6 should be carried out such that the resulting solution has a KOH concentration of about 80–190 grams per liter, preferably 120–170 grams per liter, and a $K_2MnO_4$ concentration of about 35–80 grams per liter, preferably 50–60 grams per liter. The amount of $KMnO_4$ in this solution is kept as low as possible, preferably less than 20 grams per liter. Likewise, the amount of alkali soluble impurities such as $K_2CO_3$ should be reduced to a minimum to avoid poor yields during electrolysis and an impure product, and the solution in mixing tank 6 should contain not more than 40 grams per liter, and preferably less than 30 grams per liter, of such impurities.

The solution from mixing tank 6 is then pumped into the electrolytic cell 7 for oxidation of $K_2MnO_4$ into $KMnO_4$ at a temperature of about 55–80° C., preferably 60–75° C. Since the causticizing and leaching steps are usually carried out at temperatures somewhat lower than the electrolytic oxidation, it is generally advisable to provide some means for heating tank 6, for example by indirect heat exchange or by introducing live steam into the mixture. The construction and operation of cell 7 are described in detail in U.S. Patents No. 2,843,537 and No. 2,908,620. It is important to avoid precipitation or crystallization of potassium permanganate product within the cell itself since this would cause a rapid decrease in the capacity and efficiency of the cell. In this respect, such undesirable precipitation will increase with increasing amounts of alkali-soluble impurities present within the cell so that the throughput during electrolytic oxidation is strongly influenced by the manner in which impurities are removed from the overall process.

The product solution from the electrolytic cell 7 is then led into a crystallizer 8 or similar apparatus for cooling and crystallization of $KMnO_4$ product. A slurry of the crystalline product in mother liquor can be continuously removed from the crystallizer and passed through a centrifuge 9 or similar means for filtering or separating the crystals while returning mother liquor (ML filtrate) to the crystallizer. The crystals can be further washed in the centrifuge and then dried in dryer 10 to obtain the $KMnO_4$ product. The first wash water from the centrifuge 9 is preferably recycled into the process wherever the solution must be diluted in order to avoid any loss of adherent mother liquor. It is most advantageous to combine this wash water together with the wash water from filter 5 when diluting the mother liquor (ML–II) for causticization.

The crystallizer 8 is also preferably constructed and operated as disclosed in U.S. Patents No. 2,843,537 and No. 2,908,620, wherein the hot solution from cell 7 is first led into a gas separator and then pumped upwardly through a riser connected to the crystallization vessel into a vaporizer maintained under reduced pressure by a condenser and vacuum equipment. Evaporation and reflux cooling of the hot product solution produce a state of supersaturation of the $KMnO_4$ in the solution which is then released as the solution from the vaporizer descends into the mother liquor of the crystallizer. Nuclei or small crystals of $KMnO_4$ are always present in the main body of mother liquor in the crystallizer, upon which nuclei further crystal formation can take place. Larger crystals will settle to the bottom of the crystallizer for removal as a slurry while recycle mother liquor can be withdrawn near the top or surface of the liquid in the crystallizer. The mother liquor in the crystallizer is cooled to a temperature of about 50 to 30° C., preferably to approximately 38° C.

As a general rule, the mother liquor being withdrawn from the crystallizer as a recycle stream will vary in its composition within certain limits, depending upon a number of different factors including the proportions of reactants introduced into the electrolytic cell, the efficiency of the cell itself, the potassium hydroxide concentration and temperature of the solution, the amount of alkali-soluble impurities which are permitted to accumulate and the amount of $KMnO_4$ which is effectively crystallized and separated from the mother liquor. Of course, it is desirable to separate and recover as much of the potassium permanganate as possible from the crystallizer, but as a practical consideration it is impossible and not necessarily desirable to completely free the mother liquor of potassium permanganate. Thus, it is advantageous to recycle small amounts of $KMnO_4$ to various stages of the process, e.g. as an aid in preventing hydrolysis of $K_2MnO_4$. Primary consideration is therefore given to operation of the crystallizer so as to obtain a maximum recovery of potassium permanganate without precipitating any other solids, including impurities, thereby avoiding complicated or extensive steps for purifying the separated product. In other words, purification of the potassium permanganate is substantially complete after crystallizing and centrifuging this product from the mother liquor.

In the normal operation of the electrolytic oxidation of the crude $K_2MnO_4$ which has been leached into a potassium hydroxide solution, and in accordance with this invention, the mother liquor withdrawn from the crystallizer for recycle purposes may have approximately the following composition:

|  | Concentration, grams per liter | |
| --- | --- | --- |
|  | Broad range | Preferred range |
| KOH | 120–200 | 130–170 |
| $K_2MnO_4$ | 15–65 | 20–40 |
| $KMnO_4$ | 10–30 | 15–20 |
| Alkali soluble impurities | 5–40 | 10–25 |

It should be recognized, of course, that these values of concentration are taken after an approximate equilibrium has been reached during continuous operation. The amounts of KOH, $K_2MnO_4$ and $KMnO_4$ are relatively stable and essentially determined by the efficient operation of the cell and crystallizer whereas there may be a greater fluctuation in the amount of alkali-soluble impurities, such as potassium carbonate and the potassium silicates, aluminates and phosphates, etc., because of the quantity of the manganese oxide ore being introduced into the process.

The recycled mother liquor is preferably separated into three streams, one portion ML–I being recycled from the crystallizer 8 directly to the mixing tank 6 for adjustment of the aqueous mixture just prior to electrolysis. A second portion of the mother liquor ML–II is recycled for causticization in vessel 11 and employed for leaching in vessel 3 as discussed more fully below. The third portion of the mother liquor ML–III is recycled to an evaporator 12 where sufficient water is taken off in order to precipitate the so-called "evaporator salts" in conventional manner, these precipitated salts being returned to the mixing tank 6 directly or after being redissolved. The resulting concentrated KOH solution can then be reused in the process, preferably by recycle to the first stage oxidation of the manganese oxide ore where it can be temporarily stored in any suitable vessel 13.

It will be recognized that by splitting the recycle mother liquor into three separate recycle streams, there is a high degree of flexibility in operating the overall process under optimum conditions. More importantly, the level of impurities in the system can be carefully regulated by causticizing the second stream ML–II such that alkali-soluble impurities are converted into potassium hydroxide. The proportions into which the mother liquor is separated into three recycle streams is best determined during actual operation of the process based upon a continuous analysis of the impurity level and the KOH concentration for leaching. It is desirable to reduce the amount of mother liquor recycled to the evaporator 12 to a minimum in order to avoid excessive evaporation costs.

The operation of the recycle system can be such that all of the mother liquor from crystallizer 8 is first recycled without any treatment, as represented by ML–I, to the mixing tank 6 until the impurity level reaches a maximum permissible value. The causticizing stream ML–II and/or the evaporation stream ML–III can then be operated intermittently to the extent that the impurity level must again be reduced and a higher concentration of KOH is required. Alternatively, it is preferred to carry out the entire process continuously under equilibrium conditions so as to maintain a relatively even level of impurities within prescribed limits and to continuously replenish the supply of concentrated KOH solution free of impurities. This alternative procedure permits a more accurate control of the process and avoids difficulties in adjusting the solution concentration for electrolysis. When operating under such equilibrium conditions, the recycle mother liquor is advantageously proportioned into the three separate streams about as follows:

Percent by volume
ML–I (direct recycle) _____ 78
ML–II (causticizing recycle) _____ 10
ML–III (evaporating recycle) _____ 12

The causticization of the recycle stream of mother liquor (ML–II) and its subsequent reintroduction into the process as a leaching medium constitute the essential improvements of this invention and are carried out in the following manner.

The mother liquor from crystallizer 8, having the above-mentioned concentration of dissolved components, is combined with wash water from the ore impurity separator of one or more filters 5 and introduced into a suitable reaction vessel 11. Wash water from centrifuge 9 can also be combined with this mother liquor for maximum recovery of valuable materials. The mother liquor is thus diluted in a controlled manner to provide various concentrations which have been found to be necessary in order to properly causticize for conversion of alkali-soluble impurities into potassium hydroxide and to utilize the resulting purified solution for leaching. In general, three to five parts of mother liquor are diluted with 5 to 7 parts of water by volume.

The dilution of the mother liquor prior to causticization is thus carried out in such a manner that the resulting aqueous solution contains the following concentrations of dissolved components:

|  | Grams per liter | |
| --- | --- | --- |
|  | Broad range | Preferred range |
| KOH | 30–110 | 60–100 |
| $K_2MnO_4$ | 5–60 | 25–35 |
| $KMnO_4$ | 10–70 | 20–50 |
| Alkali soluble impurities | Up to 40 | 10–20 |

The KOH concentration is preferably maintained at a value of at least 60 grams per liter in order to avoid undesirable hydrolysis of $K_2MnO_4$ and also to avoid any additional evaporation costs where causticization might not produce a sufficiently concentrated KOH solution. At the same time, a high KOH concentration should be avoided since this would adversely affect the equilibrium of the causticization reaction, and in most cases it is preferred to have a KOH concentration which does not exceed 100 grams per liter, and preferably less than 80 grams per liter. Where the impurity level is quite low, higher concentrations of KOH can be tolerated. The concentration of $K_2MnO_4$ and $KMnO_4$ are essentially dependent upon the efficient operation of the electrolytic cell and the saturation conditions of the $KMnO_4$ in the mother liquor contained in the crystallizer. The alkali soluble impurities, consisting predominately of $K_2CO_3$ are determined by the amount of such impurities introduced into the system and the effectiveness of the causticizing treatment. Therefore, it is important to dilute the mother liquor from the crystallizer so as to obtain the essential KOH concentration while permitting the concentrations of the remaining substances to fluctuate within a relatively broad range.

The diluted mother liquor is then reacted in vessel 11 with lime or calcium hydroxide according to Equation 3 above at a temperature of about 50 to 95° C., preferably 60 to 80° C. The causticizing vessel can be provided with a suitable stirring means in order to provide adequate mixing and is preferably heated to maintain an accurate temperature control. For continuous causticization, it is also helpful to preheat the diluted mother liquor to about the temperature of the reaction. The causticizing reaction proceeds more readily if the lime or calcium hydroxide is employed in excess, for example, in an amount of about 0.5 to 1.0 part by weight, calculated as $Ca(OH)_2$, for each part by weight of alkali-soluble impurities, calculated as $K_2CO_3$.

Under the above-mentioned conditions, causticization of the mother liquor is quite effective in converting the alkali-soluble impurities into potassium hydroxide, and surprisingly, the presence of $K_2MnO_4$ and $KMnO_4$ and relatively high KOH concentrations do not affect this reaction unfavorably. Furthermore, the hydrolysis of $K_2MnO_4$ is negligible and there is no substantial loss of such valuable reactant materials. Under normal operation, the causticizing reaction should be carried out over a period of about four to twenty-four and preferably about four to ten hours, depending upon the amount of impurities to be converted into KOH.

Slight modifications in the causticizing apparatus and procedure can be made without departing from the spirit and scope of this invention. For example, it will simplify the overall operation if two separate vessels are provided for causticization so that the recycled mother liquor can be continuously supplied to one vessel as the reaction proceeds in a previously filled vessel. Alternatively, the causticization can be carried out continuously in a reaction column or in a series of agitated tanks.

A particular advantage of the present invention resides in the fact that the causticized mother liquor is ideally suited for direct use as a leaching solution for treatment of the crude $K_2MnO_4$ obtained in the first stage oxidation. The causticized liquor is thus preferably conducted from the reaction vessel 11 into a storage tank (not shown) interposed between said vessel 11 and the leaching vessel 3. Where the overall process is discontinuous, the causticized mother liquor as a make-up liquid can be removed from the storage tank as required for leaching. With a continuous supply of crude $K_2MnO_4$ and continuous causticizing, there will always be available a fresh supply of leaching liquid, and the overall process is substantially continuous.

As an aqueous leaching solution, the mother liquor should be causticized to obtain a reconcentration of KOH to at least about 40 grams per liter up to about 130 grams per liter, preferably 70–110 grams per liter. At the same time, the amount of alkali-soluble impurities converted into KOH should be sufficiently high to maintain an impurity level of not more than 40 and preferably less than 25 grams per liter in the solution being subjected to electrolytic oxidation. For example, it is especially preferred to causticize to such an extent that the resulting leach solution has an impurity concentration of about 8–15 grams per liter, calculated as $K_2CO_3$. At this point the concentration of such additional alkali-soluble impurities as the potassium silicates, aluminates and the like is practically negligible.

The causticization reaction does produce calcium carbonate ($CaCO_3$) as an additional by-product impurity as well as the corresponding calcium silicates, aluminates and the like, all of which can be referred to as "calcium impurities." However, these calcium compounds are insoluble in the causticized mother liquor and remain insoluble during leaching. Therefore, these additional insoluble impurities are readily removed by the filter or filters 5 along with the normally occurring insoluble ore impurities. Also, any excess $Ca(OH)_2$ is likewise removed as a solid impurity by such filtration.

The discovery of this invention includes the fortunate coincidence that the diluted and causticized mother liquor can be readily employed for leaching. This procedure is possible, according to the invention, because the amount of dilution of the mother liquor which is required for causticization corresponds approximately to the KOH concentration which is required for leaching. Furthermore, the mother liquor can be reduced by dilution to a minimum KOH concentration for better causticization because the subsequent conversion of impurities into KOH restores the KOH concentration best suited for leaching.

The invention is further explained by the following examples and it will be understood that these examples merely illustrate a preferred embodiment of the invention and are not intended to be exclusive.

Example I

This example was carried out in order to establish the effectiveness of the causticizing reaction and the utility of the resulting liquid solution as a leaching agent.

Approximately one liter of a potassium permanganate mother liquor was diluted with an equal volume of water to provide an aqueous solution with the following composition: 72.5 g./l. KOH, 12.8 g./l. $K_2MnO_4$, 8.3 g./l. $KMnO_4$ and 17.4 g./l. $K_2CO_3$. A quantity of 45 grams of lime (CaO) were added to this diluted solution, and the resulting mixture was then stirred for approximately 8 hours while maintaining the temperature within limits of 60–65° C. The reaction mixture was periodically analyzed with the results shown in the following table:

| Time elapsed, hours | $K_2CO_3$, grams/liter | KOH, grams/liter |
|---|---|---|
| 0 | 17.4 | 72.5 |
| 2 | 13.0 | 78.9 |
| 4 | 8.0 | 82.1 |
| 8 | 6.0 | 82.7 |

During this eight hour reaction period, there was substantially no change in the original concentrations of $K_2MnO_4$ and $KMnO_4$. The $K_2CO_3$ concentration decreased by 11.4 grams per liter while the KOH concentration increased by 10.2 grams per liter. A theoretical conversion of $K_2CO_3$ would produce only 9.3 grams per liter of KOH, and the additional 0.9 gram per liter KOH was determined as being obtained from reaction with potassium silicates, aluminates, phosphates, vanadates, molybdates, arsenates, etc.

The concentrations of dissolved components in the resulting causticized solution are well within the ranges required for a leaching solution and the level of alkali-soluble impurities is sufficiently low for a very satisfactory electrolytic oxidation after leaching a crude $K_2MnO_4$.

Example II

With reference to the accompanying drawing, a continuous process is carried out for the production of potassium permanganate in the manner illustrated and after reaching an approximate equilibrium in the make-up of various process streams.

The causticizing portion of the overall process begins by withdrawing a mother liquor from the crystallizer 8, this mother liquor being an aqueous solution saturated with $KMnO_4$ at a temperature of about 38° C. and having the following composition:

160 grams/liter KOH
20 grams/liter $K_2MnO_4$
20 grams/liter $KMnO_4$
20 grams/liter $K_2CO_3$ A portion of this mother liquor (ML–II) is recycled at the rate of 6 g.p.m. (gallons per minute) to causticizing tank 11 and continuously diluted with approximately 5 g.p.m. $H_2O$ as wash water from filter 5 and an additional 2 g.p.m. $H_2O$ from another source, e.g. as wash water from the $KMnO_4$ product obtained from centrifuge 9. There is also added to the causticizing tank 11 about 0.8 lb./min. of lime (CaO), representing about 100% excess, for reaction with the potassium carbonate and with other alkali-soluble impurities which are present in relatively small amounts.

The causticizing reaction is carried out at a temperature of 70° C. by steam heating tank 11 and with constant stirring and agitation of the reaction mixture. The causticized product stream is continuously withdrawn so as to maintain an approximately constant volume in the reaction vessel, i.e., at a rate of about 13 g.p.m., and led into leaching vessel 3. The retention time in the causticizing vessel is sufficiently long to provide a causticized product with the following composition:

80 grams/liter KOH
10 grams/liter $K_2CO_3$
30 grams/liter $K_2MnO_4$
30 grams/liter $KMnO_4$ A crude $K_2MnO_4$ product obtained from the first oxidation stage of the process is combined and mixed with the diluted and causticized mother liquor in the leacher 3 which is maintained at a temperature of about 80° C. The mother liquor not only dissolves $K_2MnO_4$ in the oxidation product, but also dissolves $K_2CO_3$ and other alkali-soluble impurities with which this crude product is contaminated. Also, a small amount of potassium hydroxide accompanies the crude $K_2MnO_4$ and serves to increase the alkaline concentration of the resulting leach solution. Insoluble ore impurities, calcium carbonate and excess calcium hydroxide are carried along in the leach solution without being dissolved.

The leach solution is directed through filter 5 and led as the filtrate into mixing tank 6 at the rate of 15 g.p.m. This leach solution has approximately the following composition with respect to dissolved substances:

95 grams/liter KOH
20 grams/liter $K_2CO_3$
130 grams/liter $K_2MnO_4$
30 grams/liter $KMnO_4$ The insoluble impurities are removed by the filter 5 and after separation from the filtrate are washed with 7 g.p.m. water and discharged from the system. The wash water is recycled to the causticizer at the rate of 5 g.p.m. as noted above, the wash water being recovered in a number of stages so that only the first stages need be recycled for retention of valuable dissolved materials.

The leach solution as filtrate from filter 5 is continuously combined in mixing tank 6 with recycle mother liquor (ML-II) which is returned from crystallizer 8 at the rate of 65 g.p.m. It is preferable to also add to this mixing tank the small amount of salts precipitated from evaporator 12. The combined streams are then heated to approximately 65° C. and led through cell 7 for conversion of $K_2MnO_4$ into $KMnO_4$. A slurry of $KMnO_4$ crystals is removed from the crystallizer 8 and passed through centrifuge 9 with the mother liquor filtrate being returned to the crystallizer. The crystals are then washed with about 2 g.p.m. water for recovery of adherent mother liquor, and this wash water is recycled to causticizer 11. After additional washing followed by drying in dryer 10 at about 120° C., a very pure $KMnO_4$ product is recovered at the rate of about 10 pounds per minute.

In order to reconcentrate a portion of the mother liquor, a recycle stream (ML-III) is directed to evaporator 12 at about 9 g.p.m. for removal of water and then stored 13 for reuse in the first oxidizing step 1.

In the foregoing specification and examples, the term "alkali-soluble impurity" refers to those impurities such as potassium carbonate which are normally soluble in dilute caustic solutions, i.e. aqueous solutions of potassium hydroxide in which the KOH concentration does not exceed about 20% by weight. These alkali-soluble impurities are very troublesome in the overall process because they will precipitate in very concentrated caustic solutions, and even with more dilute caustic solutions, the impurities tend to form deposits on apparatus parts such as in the electrolytic cell, and these deposits are extremely difficult to remove. Moreover, an accumulation of alkali-soluble impurities in the overall process eventually leads to a very impure $KMnO_4$ product and/or a substantial reduction in efficiency and yields.

The present invention provides a highly effective means of removing alkali soluble impurities with the particular causticizing procedure disclosed herein, whereby the overall process for producing potassium permanganate can be carried out continuously and without costly shutdowns. Also, the causticizing procedure of the invention eliminates excessive costs of evaporation and filtration in the removal of both soluble and insoluble impurities. As a result, there is a considerable saving in both capital and operating expenses.

The invention is hereby claimed as follows:

1. In a process for producing and recovering potassium permanganate from a crude solid potassium manganate VI obtained by oxidation of a manganese oxide ore, the steps comprising:
   (a) leaching the crude solid potassium manganate VI with a causticized aqueous mother liquor containing potassium hydroxide, potassium permanganate, potassium manganate VI and at least one insoluble calcium salt in order to dissolve said crude potassium manganate VI;
   (b) separating said insoluble calcium salt and insoluble ore impurities from the leach solution of step (a);
   (c) electrolytically oxidizing potassium manganate VI, which is dissolved in the aqueous potassium hydroxide leach solution, to potassium permanganate;
   (d) crystallizing potassium permanganate from the oxidized solution of step (c), and separating a mother liquor consisting essentially of an aqueous solution of potassium hydroxide, potassium permanganate, potassium manganate VI and at least one alkali-soluble impurity from the potassium permanganate crystals;
   (e) causticizing at least a portion of the mother liquor by reacting calcium hydroxide with said mother liquor at a temperature of about 50° C. to 95° C. for converting at least part of said alkali-soluble impurity into said insoluble calcium salt and regenerating potassium hydroxide; and
   (f) passing the causticized mother liquor to step (a).

2. A process as claimed in claim 1 wherein calcium hydroxide is reacted with said mother liquor in step (e) at a temperature of 60° C. to 80° C.

3. A process as claimed in claim 1 wherein the alkali-soluble impurity is potassium carbonate which is converted by causticization in step (e) into calcium carbonate as the insoluble calcium salt.

4. A process as claimed in claim 1 wherein the initial concentration of KOH in the mother liquor, after separation in step (d) and prior to reaction with calcium hydroxide in step (e), is about 60 to 100 grams per liter.

5. A process as claimed in claim 1 wherein the concentration of KOH in the mother liquor during the causticizing reaction of step (e) is maintained within limits of 30–140 grams per liter.

6. A process as claimed in claim 1 wherein the concentration of KOH in the mother liquor during the causticizing reaction of step (e) is maintained within limits of about 70 to 110 grams per liter.

7. In the process for producing and recovering potassium permanganate from a crude solid potassium manganate VI obtained by oxidation of a manganese oxide ore, the steps comprising:

(a) leaching the crude solid potassium manganate VI with a causticized aqueous mother liquor containing potassium hydroxide, potassium permanganate, potassium manganate VI and solid calcium carbonate in order to dissolve said crude potassium manganate VI, (b) separating said solid calcium carbonate and insoluble ore impurities from the leach solution of step (a);

(c) electrolytically oxidizing potassium manganate VI, which is dissolved in the aqueous potassium hydroxide leach solution, to potassium permanganate;

(d) crystallizing potassium permanganate from the oxidized solution of step (c), and separating a mother liquor consisting essentially of an aqueous solution of potassium hydroxide, potassium permanganate, potassium manganate VI and potassium carbonate from the potassium permanganate crystals;

(e) causticizing at least a portion of the mother liquor by reacting calcium hydroxide with said mother liquor at a temperature of about 60° C. to 80° C., while maintaining the concentration of KOH in the mother liquor within limits of about 70 to 110 grams per liter, for converting at least part of said potassium carbonate into said solid calcium carbonate and regenerating potassium hydroxide; and (f) passing the causticized mother liquor to step (a).

References Cited in the file of this patent

UNITED STATES PATENTS

| | | |
|---|---|---|
| 1,337,239 | McCormack | Apr. 20, 1920 |
| 1,377,485 | Jenkins et al. | May 10, 1921 |
| 2,843,537 | Carus | July 15, 1958 |
| 2,908,620 | Carus | Oct. 13, 1959 |
| 2,940,822 | Carus et al. | June 14, 1960 |